US009709727B2

(12) United States Patent
Goto et al.

(10) Patent No.: US 9,709,727 B2
(45) Date of Patent: Jul. 18, 2017

(54) LIGHT ASSEMBLY WITH CONFORMING SEAL

(71) Applicant: Tyco Electronics Canada ULC, Markham (CA)

(72) Inventors: Kazuhiro Goto, Burlington (CA); Jaroslaw Henryk Dawidziuk, Whitby (CA)

(73) Assignee: TYCO ELECTRONICS CANADA ULC, Markham (CA)

( * ) Notice: Subject to any disclaimer, the term of this patent is extended or adjusted under 35 U.S.C. 154(b) by 27 days.

(21) Appl. No.: 14/188,277

(22) Filed: Feb. 24, 2014

(65) Prior Publication Data

US 2015/0241626 A1    Aug. 27, 2015

(51) Int. Cl.
| | |
|---|---|
| *F21V 17/00* | (2006.01) |
| *F21V 8/00* | (2006.01) |
| *B60Q 1/32* | (2006.01) |
| *F21S 8/10* | (2006.01) |

(Continued)

(52) U.S. Cl.
CPC ........... *G02B 6/0096* (2013.01); *B60Q 1/323* (2013.01); *F21S 48/212* (2013.01); *F21S 48/215* (2013.01); *F21S 48/2206* (2013.01); *F21S 48/2237* (2013.01); *F21S 48/2268* (2013.01); *F21S 48/2287* (2013.01); *F21S 48/30* (2013.01); *F21S 48/33* (2013.01); *G02B 6/001* (2013.01); *F21V 27/02* (2013.01); *F21V 31/005* (2013.01)

(58) Field of Classification Search
CPC .... G02B 6/001; G02B 6/3869; G02B 6/3843; G02B 6/36; G02B 6/3604; G02B 6/0096; F21S 48/33; F21V 31/005

USPC .......................................................... 362/581
See application file for complete search history.

(56) References Cited

U.S. PATENT DOCUMENTS

| | | | | |
|---|---|---|---|---|
| 4,605,990 A | * | 8/1986 | Wilder et al. ................. | 362/581 |
| 4,740,870 A | * | 4/1988 | Moore et al. ................. | 362/477 |
| 5,548,676 A | * | 8/1996 | Savage, Jr. .................... | 385/92 |

(Continued)

FOREIGN PATENT DOCUMENTS

| | | |
|---|---|---|
| DE | 88 03 570 U1 | 6/1988 |
| DE | 10 2004 055 337 A1 | 6/2005 |

(Continued)

OTHER PUBLICATIONS

International Search Report, International Application No. PCT/US2015/017183, International Filing Date, Feb. 24, 2015.

*Primary Examiner* — Anh Mai
*Assistant Examiner* — Matthew Peerce

(57) ABSTRACT

A light assembly is provided that includes a housing, a light pipe assembly, and a conforming seal. The housing has a cavity extending through the housing between first and second ends of the housing. The housing holds a light source that is configured to emit light within the cavity. The light pipe assembly has an attachment end disposed at the first end of the housing. The light emitted by the light source is received by the light pipe assembly at the attachment end and is transmitted through the light pipe assembly. The conforming seal has a tubular shape that at least partially surrounds the housing and the light pipe assembly. A first segment of the conforming seal extends along the light pipe assembly and conforms to the light pipe assembly. A second segment of the conforming seal extends along the housing and conforms to the housing.

19 Claims, 5 Drawing Sheets

(51) Int. Cl.
*F21V 27/02* (2006.01)
*F21V 31/00* (2006.01)

(56) References Cited

U.S. PATENT DOCUMENTS

| | | | |
|---|---|---|---|
| 6,095,673 A * | 8/2000 | Goto et al. | 362/582 |
| 6,779,929 B1 * | 8/2004 | Savage, Jr. | G02B 6/322 |
| | | | 385/88 |
| 7,425,079 B2 * | 9/2008 | Bruce et al. | 362/84 |
| 7,789,547 B2 * | 9/2010 | Holder et al. | 362/581 |
| 8,147,110 B2 * | 4/2012 | Goto | G02B 6/0006 |
| | | | 362/551 |
| 8,540,409 B2 * | 9/2013 | Eichelberger | 362/581 |
| 9,146,341 B2 * | 9/2015 | Jones | G02B 6/0006 |
| 2002/0126498 A1 | 9/2002 | Atkinson et al. | |
| 2003/0081423 A1 | 5/2003 | Shinji et al. | |
| 2004/0012979 A1 * | 1/2004 | Squicciarini | 362/555 |
| 2005/0105876 A1 * | 5/2005 | Finona et al. | 385/139 |
| 2005/0248944 A1 * | 11/2005 | Sloan | 362/251 |
| 2006/0002125 A1 * | 1/2006 | Kim et al. | 362/509 |
| 2007/0159813 A1 * | 7/2007 | Husbands | A41G 1/005 |
| | | | 362/122 |
| 2009/0022457 A1 * | 1/2009 | de Jong | G02B 6/3846 |
| | | | 385/96 |
| 2013/0010004 A1 * | 1/2013 | Ligorano | G02B 6/04 |
| | | | 345/690 |
| 2015/0085519 A1 * | 3/2015 | Ammar et al. | 362/581 |

FOREIGN PATENT DOCUMENTS

| | | |
|---|---|---|
| EP | 1 853 096 A2 | 11/2007 |
| GB | 2 470 350 A | 11/2010 |
| JP | 2005 228532 A | 8/2005 |
| WO | 00/34708 A1 | 6/2000 |

* cited by examiner

LIGHT ASSEMBLY WITH CONFORMING SEAL

BACKGROUND OF THE INVENTION

The subject matter herein relates generally to light assemblies.

Some current lighting applications utilize a light pipe with a light source to distribute the light generated by the light source over a distance. Such lighting applications may include, for example, automotive exterior lighting, automotive interior ambient lighting, commercial lighting, lighting in household devices, and the like. The light pipe is typically a cylindrical, transparent structure. The light pipe may be aligned with the light source such that the light source is located at an end of the light pipe. The light generated by the light source is received at the end of the light pipe and transmitted longitudinally along the length of the light pipe by internal reflection. The light may be emitted from the surface of the light pipe along the length of the light pipe in a direction transverse to the longitudinal direction of the light pipe. In addition, or alternatively, the light may be emitted in an axial direction through a distal end of the light pipe opposite to the end proximate to the light source that receives the light. To increase light intensity and/or improve light gradient along the light pipe, a different light source may be located at either end of the light pipe.

Light assemblies that include light pipes advantageously allow for the transmission of light over a designated distance (e.g., defined by the length of the light pipe) using only a single light source at an end of the light pipe instead of multiple light sources spaced along a length. As such, the light source and associated components that generate the light may be hidden or disguised in the application so as to not distract from the light display.

Light assemblies that are used in external applications, such as for automotive exterior lighting, are exposed to contaminants and harsh environmental conditions. For example, an external lighting assembly may experience moisture, dirt, dust, sand, chemicals, extreme temperatures, vibrations and other forces, and the like, on a daily basis, especially for vehicle applications located at the front of the vehicle or near the wheels. Generally, light pipe lighting assemblies include a housing that holds the light source and shields the light source and associated components (e.g., printed circuit board, wires, and other electrical components). However, the housing does not fully surround and protect the light source because the housing generally includes one or more openings used to allow wires to extend from the housing, to couple to the light pipe, and/or to provide an unobstructed optical path from the light source to the light pipe. Therefore, contaminants may enter the housing through the openings, where the contaminants may damage the generation and transmission of light, or may even damage the light generating components and circuitry, which would require a repair. Additionally, the light pipe itself may not have sufficient abrasion resistance properties to withstand damage from sand, gravel, and the like, without a diminution of optical properties To prohibit damage from contaminants and harsh environmental conditions, some known light assemblies attempt to seal one or more openings of the housing using various adhesives that are applied during assembly. For example, glue, epoxy, potting compounds, or the like may be applied to the end of a light pipe and/or to the opening of the housing to couple and seal the two parts. These compounds may be messy, labor intensive to apply, and/or expensive. In addition, once the adhesive sets at the assembly plant, the orientation of the light pipe is fixed relative to the housing, which limits the flexibility of integrating the light assembly within applications, such as vehicle running boards. Alternatively, or in addition, some known light assemblies use gaskets, such as peripheral seals, to provide a seal between the light pipe and the housing. But, using gaskets may be expensive, labor intensive, and risk failure in the elements (e.g., in cold temperatures). Such gaskets may also increase the overall size of the light assembly. A need remains for a sealed light assembly that may be used in external applications that avoids at least some of the identified issues and allows for some dimensional flexibility and shape tolerance between the light pipe and the housing.

BRIEF DESCRIPTION OF THE INVENTION

In an embodiment, a light assembly includes a housing, a light pipe assembly, and a conforming seal. The housing has a first end and a second end. The housing defines a cavity extending through the housing between the first and second ends. The housing has first and second openings to the cavity at the first and second ends, respectively. The housing holds a light source within the cavity. The light source is configured to emit light. The light pipe assembly is elongated between an attachment end and an opposing distal end. The attachment end of the light pipe assembly is disposed at the first end of the housing. The attachment end of the light pipe assembly is optically coupled to the light source such that the light emitted by the light source is received by the light pipe assembly at the attachment end and is transmitted through the light pipe assembly towards the distal end. The conforming seal has a tubular shape that at least partially surrounds the housing and the light pipe assembly. A first segment of the conforming seal extends along the light pipe assembly and conforms to the light pipe assembly. A second segment of the conforming seal extends along the housing and conforms to the housing.

In an embodiment, a light assembly includes a housing, a light pipe assembly, an alignment sleeve, and a conforming seal. The housing has a first end and a second end. The housing defines a cavity extending through the housing between the first and second ends. The housing has first and second openings to the cavity at the first and second ends, respectively. The housing holds a light source within the cavity. The light source is configured to emit light. The light pipe assembly is elongated between an attachment end and an opposing distal end. The attachment end of the light pipe assembly is disposed at the first end of the housing and optically coupled to the light source such that the light emitted by the light source is received by the light pipe assembly at the attachment end and is transmitted through the light pipe assembly towards the distal end. The alignment sleeve has a receiving end that receives the attachment end of the light pipe assembly and a mounting end that is received within the first opening of the housing at the first end. The receiving end holds the light pipe assembly in a fixed position relative to the alignment sleeve. The mounting end is rotatable relative to the housing to orient the light pipe assembly at a desired position relative to the housing. The conforming seal has a tubular shape that surrounds and encloses the alignment sleeve and at least partially surrounds the housing and the light pipe assembly. A first segment of the conforming seal extends along the light pipe assembly and conforms to the light pipe assembly. A second segment of the conforming seal extends along the housing and conforms to the housing.

In an embodiment, a light assembly includes a housing, a light pipe assembly, and a conforming seal. The housing has a first end and a second end. The housing defines a cavity that extends through the housing between the first and second ends. The housing has first and second openings to the cavity at the first and second ends, respectively. The housing holds a light source within the cavity. The light source is configured to emit light. The light pipe assembly includes a light pipe and a shroud at least partially covering a surface of the light pipe. The light pipe assembly is elongated between an attachment end and an opposing distal end. The attachment end of the light pipe assembly is disposed at the first end of the housing. The attachment end of the light pipe assembly is optically coupled to the light source such that the light emitted by the light source is received by the light pipe at the attachment end and is transmitted through the light pipe towards the distal end. The conforming seal has a tubular shape that at least partially surrounds the housing and the light pipe assembly. A first segment of the conforming seal extends along the light pipe assembly and conforms to the light pipe assembly. A second segment of the conforming seal extends along the housing and conforms to the housing.

DETAILED DESCRIPTION OF THE INVENTION

One or more embodiments of the subject matter described herein provide a sealed light assembly that may be used in external applications.

Figure 1:
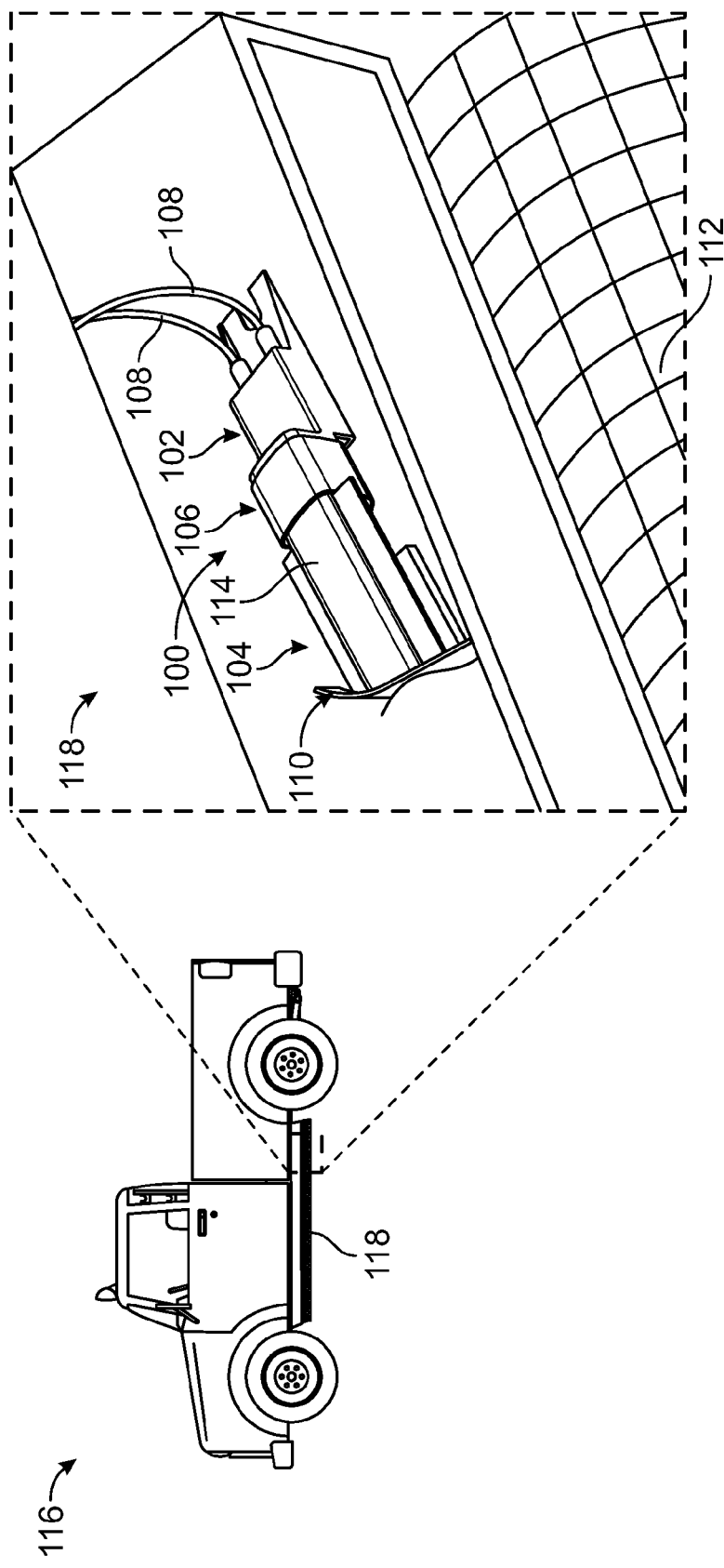
FIG. 1 is a perspective view of a light assembly formed in accordance with an exemplary embodiment.

FIG. 1 is a perspective view of a light assembly 100 formed in accordance with an exemplary embodiment. The light assembly 100 includes a housing 102, a light pipe assembly 104, and a conforming seal 106. The housing 102 may hold a light source 202 (shown in FIG. 2) that is configured to emit light. The light source 202 may be provided power and/or control signals by one or more wires 108 that are electrically coupled to the light source 202. The wire 108 may be received in and extend from the housing 102. In an exemplary embodiment, the light source 202 is optically coupled to the light pipe assembly 104 such that light emitted by the light source 202 is received by the light pipe assembly 104. The term optically coupled, as used herein, does not require that the objects be directly mechanically or chemically (e.g., by glue or other chemical adhesives) coupled to each other, but also does not preclude such coupling.

The light pipe assembly 104 has an elongated body that is at least partially formed of a light transmissive material. The light received from the light source 202 is transmitted within the light transmissive material (e.g., by internal reflection) along at least a portion of the length of the light pipe assembly 104 before the light is emitted from the light pipe assembly 104. The light that is emitted by the light pipe assembly 104 may provide illumination along the full length of the light pipe assembly 104 or at one or more defined axial locations along the length, depending on the configuration of the light pipe assembly 104. In addition, the light pipe assembly 104 may be configured to direct light that is emitted from the light pipe assembly 104 in one or more defined directions.

The light assembly 100 may be used in various applications, such as automotive exterior lighting, automotive interior lighting, commercial lighting, household devices, and the like. For example, the light assembly 100 may be installed on an external component of an automobile, such as a running board, an underbody or frame, a rear bumper, a spoiler, and the like. In exterior applications, such as those listed above, the light assembly 100 is exposed to various elements and/or contaminants, such as dirt, dust, sand, liquids, chemicals, harsh temperatures, vibration, wind, and the like. The conforming seal 106 is configured to conform to both the light pipe assembly 104 and the housing 102 at the interface between the light pipe assembly 104 and the housing 102. The conforming seal 106 provides a seal that prohibits contaminants (e.g., dirt, liquids, etc.) from entering the housing 102 and interfering with the generation of light, such as by clouding up the light source 202 (shown in FIG. 2) or temporarily shorting the electrical circuitry that powers the light source 202. In addition, the conforming seal 106 prohibits contaminants from causing more permanent damage to the electrical components (e.g., light source 202, wire 108, drivers, associated circuitry, and the like), which would require repairs to the light assembly 100.

FIG. 1 illustrates an exemplary application of the light assembly 100 on a running board 118 of a truck 116. The light that is emitted by the light pipe assembly may provide illumination of the running board 118 at night so that a passenger is able to see the running board during entry or exit of the truck 116. As shown in FIG. 1, the light pipe assembly 104 of the light assembly 100 may be received within a compartment 110 of the running board 118. The light pipe assembly 104 may be oriented within the compartment 110 such that light is emitted from the light pipe assembly 104 at least in the direction towards the step portion 112 of the running board 118 to illuminate the step 112. The light pipe assembly 104 may include a light pipe 222 (shown in FIG. 2) and a shroud 114 that encloses the light pipe 222 and provides abrasion resistance for the light pipe 222. The shroud 114 may be light transmissive to allow light to be transmitted from the light pipe 222 through the shroud 114 to the environment. Optionally, at least a portion of the shroud 114 may have a reflective surface or layer to direct light towards the step 112 and prohibit light from being emitted in a direction away from the step 112 to reduce the amount of wasted light. Although the light pipe assembly 104 may be received at least partially in the compartment 110, the housing 102, conforming seal 106, and end of the light pipe assembly 104 that optically couples to the housing 102 may be exposed to the elements. Therefore, the conforming seal 106 provides protection to the light assembly 100 against debris and other contaminants.

In addition, the conforming seal 106 may also serve as a mechanical retention device that holds the light pipe assembly 104 to the housing 102. For example, the light assembly 100 may encounter harsh temperatures and various forces, such as vibrations, expansions and contractions due to temperature changes, wind, and the like, which could pull the light pipe assembly 104 and the housing 102 apart. The conforming seal 106 may conform to both the housing 102 and the light pipe assembly 104, and the conforming seal 106 may absorb and oppose the forces that pull the housing 102 and the light pipe assembly 104 apart. Therefore, the conforming seal 106 holds light pipe assembly 104 to the housing 102, providing retention against forces in the elements, in addition to sealing the light assembly 100 from debris and other contaminants.

Figure 2:
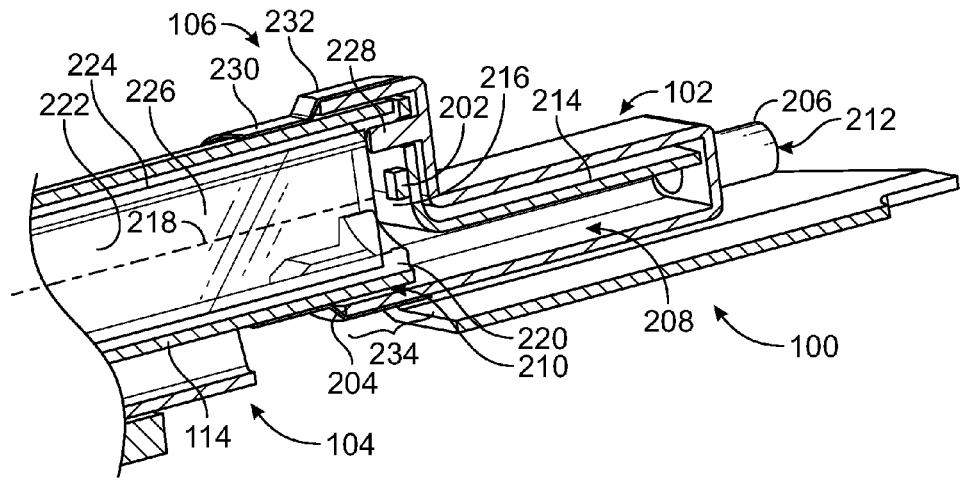
FIG. 2 is a cross-section of the embodiment of the light assembly shown in FIG. 1.

FIG. 2 is a cross-section of the embodiment of the light assembly 100 shown in FIG. 1. The housing 102 has a first end 204 and a second end 206. The housing 102 defines a cavity 208 that extends through the housing 102 between the first and second ends 204, 206. The housing 102 also includes first and second openings 210, 212 to the cavity 208 at the first and second ends 204, 206, respectively.

The housing 102 holds at least one light source 202 within the cavity 208. The light source 202 is configured to generate and emit light. For example, the light source 202 may be light emitting diode (LED). The light source 202 may be tri-color red green blue (RGB) LED that is controllable to emit red light, green light, blue light, and/or combinations thereof. The light source 202 may be controlled by a light engine 214 to generate light. For example, the light engine 214 may control when the light source 202 produces light and may also control the optical characteristics of the light emitted, such as wavelength (e.g., color), luminance, and the like. For example, if the light source 202 is an RGB LED, the light engine 214 may control the light source 202 to generate a red light for a period of time, then a blue light for another period of time. Optionally, the light engine 214 may control the light source 202 to generate a first shade of red for a period of time, then a second shade of red for another period of time. Alternatively, the light source 202 may be a monochromatic white LED that emits white light, an incandescent bulb that emits a yellow light, or other light sources. Although only one light source 202 is shown in FIG. 2, in other embodiments multiple light sources may be held within the housing 102.

The light engine 214 includes electronic control gear associated with the light source 202, such as drivers and/or controllers (not shown). The light engine 214 controls one or more optical characteristics of the light generated by the light source 202 by, for example, providing power to the light source 202 and adjusting the wavelength, luminous flux, and/or polarization of the light generated by the light source 202. The wires 108 (shown in FIG. 1) may provide power and/or control signals to the light engine 214. The light engine 214 may include a printed circuit board (PCB) 216. The drivers and/or controllers (not shown) of the light engine 214 that control the light generated by the light source 202 may be embedded on the PCB 216. As shown in FIG. 2, the light source 202 is mounted to the PCB 216, and the PCB 216 is mounted within the cavity 208 of the housing 102. For example, the PCB 216 may be mounted and retained in the housing 102 by alignment features in the housing 102 and/or by a separate carrier that holds and aligns the PCB 216 relative to the housing 102.

In an exemplary embodiment, the housing 102 may be formed at least partially of a conductive material, such as a metal. For example, the housing 102 may be an aluminum cast housing. In addition, the PCB 216 may be formed with a metal backing, such as aluminum, such that heat generated by the PCB 216 may be readily transferred to the housing 102 and dissipated from the housing 102. Alternatively, or in addition, the housing 102 may be formed of one or more insulating materials to provide electrical insulation for the electronic components, such as the light source 202, the PCB 216, and associated circuitry within the housing 102. For example, the housing 102 may be composed of one or more plastic, rubber-like polymer, ceramic, glass, and/or the like, and may be formed by a molding process.

The first opening 210 of the housing 102 provides an optical path from the light source 202 to the light pipe assembly 104, which is disposed at the first end 204. The light source 202 may be aligned with the first opening 210 to provide a linear optical path to the light pipe assembly 104. The first opening 210 may be configured to receive the light pipe assembly 104 therein.

Figure 3:
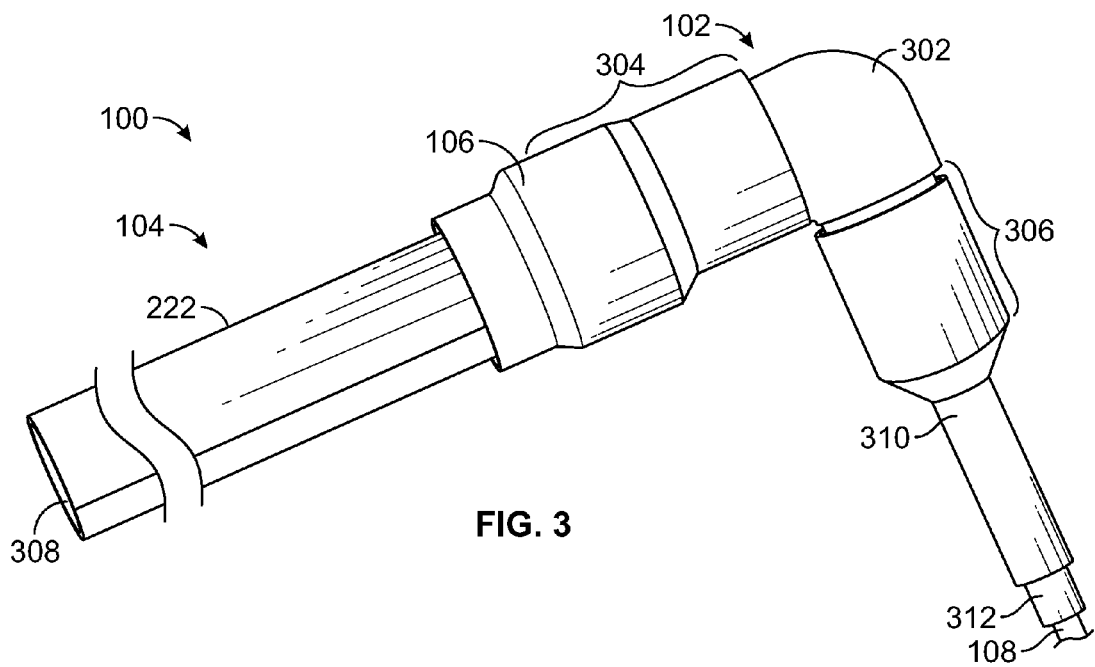
FIG. 3 is a perspective view of a light assembly formed in accordance with an exemplary embodiment.

The light pipe assembly 104 is elongated along a pipe axis 218 between an attachment end 220 and a distal end 308 (shown in FIG. 3). The attachment end 220 is disposed at the first end 204 of the housing 102. The attachment end 220 is optically coupled to the light source 202 such that the light emitted by the light source 202 is received by the light pipe assembly 104 at the attachment end 220 and is transmitted through the light pipe assembly 104. In an exemplary embodiment, the attachment end 220 is received within the first opening 210 of the housing 102. The housing 102 may include a stop pin 228 that protects the light source 202. The light pipe assembly 104 may be loaded into the first opening 210 until the attachment end 220 contacts the stop pin 228, so the attachment end 220 does not risk contacting and potentially damaging the light source 202.

The light pipe assembly 104 includes a light pipe 222 formed of a light transmissive material. The light pipe assembly 104 optionally may also include a shroud 114, a light guide (not shown), a lens (not shown), and/or a reflective surface element (not shown). The light pipe assembly 104 shown in FIG. 2 includes a light pipe 222 and a shroud 114. The shroud 114 at least partially covers a surface 224 of the light pipe 222. For example, the shroud 114 may cover or enclose the light pipe 222 in order to provide abrasion resistance to the light pipe 222 to protect the light pipe 222 from debris and other environmental elements. The shroud 114 may be formed of a light transmissive material, such as acrylic, polycarbonate, and/or another thermoplastic polymer, to allow light emitted from the light pipe 222 to transmit through the shroud 114 and into the surrounding environment. Optionally, at least a portion of the shroud 114 may include a reflective layer that is configured to direct light emitted from the light pipe assembly 104 in one or more axial locations along the pipe axis 218 and/or in one or more directions relative to the pipe axis 218. For example, in the example application of the running board 118 in FIG. 1, the shroud 114 may direct light rays to be emitted from the light pipe assembly 104 in a direction generally towards the step 112, while prohibiting light from being wasted by being emitted in directions that would not light up the step 112.

The light transmissive material of the light pipe 222 may be acrylic, polycarbonate, and/or another thermoplastic polymer. The light pipe 222 may be solid, having an interior region 226 surrounded by the surface 224. The light pipe 222 may be transparent, or at least translucent, to allow the transmission of light within the interior region 226. A molding process, such as injection molding, an extrusion process, or the like, may be used to form the light pipe 222. The light pipe 222 may be generally cylindrical in shape with a circular or elliptical cross-section. Alternatively, the light pipe 222 may be an elongated prism. The light pipe 222 may extend linearly along the length of the light pipe assembly 104 or may have at least one bend or curve. The material and shape of the light pipe 222 permits light generated by the light source 202 to propagate through the light pipe 222 via internal reflection.

The conforming seal 106 may have a tubular shape that at least partially surrounds the housing 102 and the light pipe assembly 104. The conforming seal 106 may wrap around a perimeter of both the light pipe assembly 104 and the housing 102 at an interface region 234, where the light pipe assembly 104 and the housing 102 interface. The conforming seal 106 may at least partially surround the housing 102 and light pipe assembly 104 by extending fully around the perimeters of the light pipe assembly 104 and the housing 102 without extending into the interface region 234 or in any way interfering with the optical coupling between the light pipe assembly 104 and the light source 202 within the housing 102. A first segment 230 of the conforming seal 106 extends along the light pipe assembly 104 and a second segment 232 extends along the housing 102. The attachment end 220 of the light pipe assembly 104 may be received within the first opening 210 of the housing 102 such that the light pipe assembly 104 and the housing 102 at least partially overlap at the interface region 234. However, in other embodiments the attachment end 220 may be disposed near the first end 204 without being received within the first opening 210, such that the light pipe assembly 104 and the housing 102 do not overlap at the interface region 234. In either case, the conforming seal 106 conforms to both the light pipe assembly 104 and the housing 102 to provide an external seal at the interface region 234 that repels contaminants and holds the light pipe assembly 104 and housing 102 together.

The first segment 230 conforms to the light pipe assembly 104, while the second segment 232 conforms to the housing 102, sealing the interface region 234 between the light pipe assembly 104 and the housing 102 to prohibit debris and other contaminants from entering the housing 102 through the first opening 210. Depending on the make-up of the light pipe assembly 104, the first segment 230 may conform to the shroud 114 only, the light pipe 222 only, or to both the shroud 114 and the light pipe 222, such as if the shroud 114 only covers part of the perimeter of the light pipe 222.

The conforming seal 106 may be composed of a thermoplastic material, such as nylon, polyolefin, a fluoropolymer (e.g., fluorinated ethylene propylene (FEP), polytetrafluoroethylene (PTFE), etc.), polyvinylchloride (PVC), neoprene, a silicone elastomer, and/or the like. The conforming seal 106 may provide thermal and electrical insulation to the light assembly 100, as well as abrasion resistance. Optionally, the conforming seal 106 may include an added UV stabilizer, especially for external applications. In an exemplary embodiment, the conforming seal 106 includes an inner adhesive lining. As the conforming seal 106 conforms to the components (e.g., the housing 102 and light pipe assembly 104) surrounded by the seal 106, the adhesive lining may form an effective moisture-proof barrier between the conforming seal 106 and the components. In addition to providing a barrier against fluids and other contaminants, the adhesive lining may tightly grip the components as the conforming seal 106 conforms to provide good adhesion between the conforming seal 106 and the components. The adhesive lining may be a meltable thermoplastic adhesive, for example.

FIG. 3 is a perspective view the light assembly 100 formed in accordance with another exemplary embodiment. The embodiment of the light assembly 100 shown in FIG. 3 may be similar to the embodiment of the light assembly 100 shown in FIGS. 1 and 2.

In the embodiment shown in FIG. 3, the housing 102 has a right-angle body 302 instead of an in-line body as shown in FIGS. 1 and 2. The light pipe assembly 104 extends from the first end 204 (shown in FIG. 2) of the housing 102, while the one or more wires 108 extend from the second end 206 (shown in FIG. 2). The right-angle body 302 has a first housing segment 304 that includes the first end 204, and a second housing segment 306 that includes the second end 206. The first housing segment 304 is oriented transversely to the second housing segment 306. For example, the first housing segment 304 may be orthogonal to the second housing segment 306. Optionally, the light pipe assembly 104 may extend generally parallel to the first housing segment 304, and the wire 108 may extend generally parallel to the second housing segment 306, such that the light pipe assembly 104 may be transverse to the wire 108. Therefore, depending on the application and/or preferences, the housing 102 may have an in-line body or a right-angle body 302 to configure the direction of the exiting one or more wires 108 relative to the light pipe assembly 104. The actual angle between the first and second housing segments 304, 306 in the right-angle body 302 need not be a right angle.

The light pipe assembly 104 of FIG. 3 includes a light pipe 222 but does not show a shroud 114 (shown in FIGS. 1 and 2). The light pipe assembly 104 extends to a distal end 308. Light received at the attachment end 220 (shown in FIG. 2) is transmitted through the interior region 226 (shown in FIG. 2) of the light pipe 222 towards the distal end 308. The light pipe assembly 104 may be formed with a defined length based on the intended application and/or preferences of the light assembly 100. For example, a longer running board 118 (shown in FIG. 1) may use a longer light pipe assembly 104 than a shorted running board 118.

Optionally, the light assembly 100 may include a wire conforming seal 310. The wire conforming seal 310 at least partially surrounds the housing 102 and the one or more wires 108 that extend from the second end 206 (shown in FIG. 2) of the housing 102. The wire conforming seal 310 may be similar in composition to the conforming seal 106, although in other embodiments the wire conforming seal 310 need not have the same composition or be formed using the same manufacturing process as the conforming seal 106. Optionally, multiple wires 108 may be grouped within an inner wire conforming seal 312. The inner wire conforming seal 312 may hold multiple wires 108 together, such as by conforming to the wires 108 and/or using adhesives. When an inner wire conforming seal 312 is used, the wire conforming seal 310 may seal the housing 102 to the inner wire conforming seal 312, instead of directly to the one or more wires 108.

Figure 4:
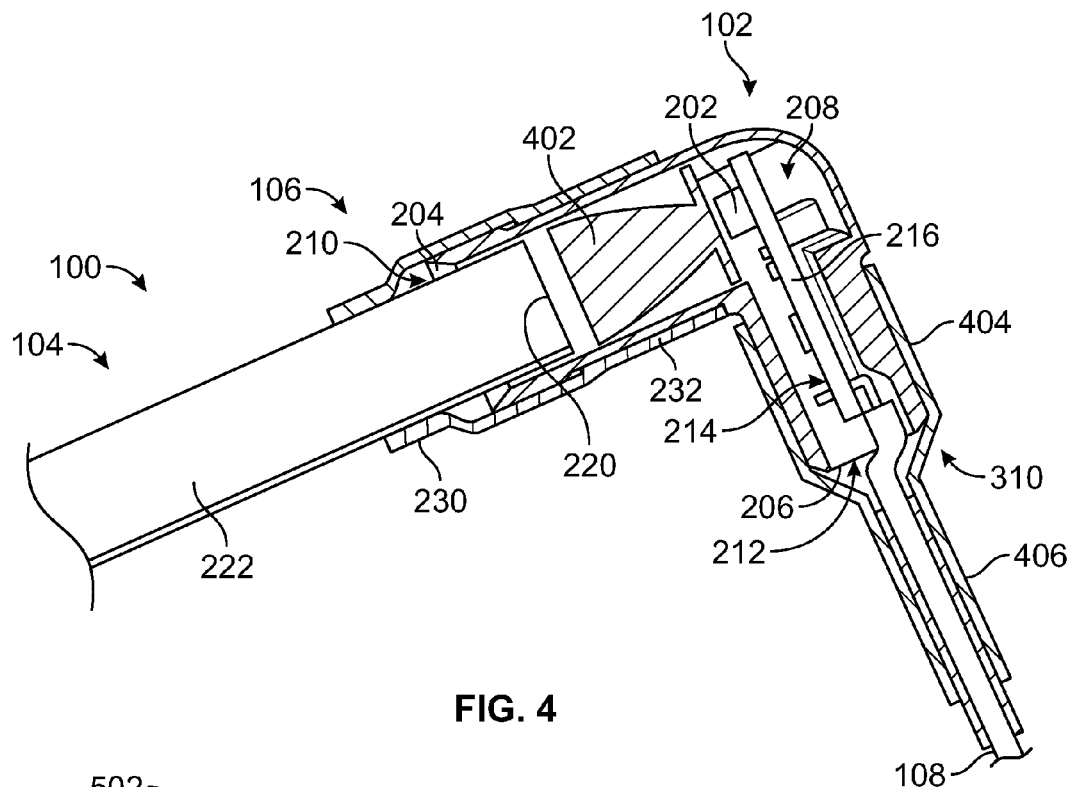
FIG. 4 shows a cross-section of the embodiment of the light assembly shown in FIG. 3.

FIG. 4 shows a cross-section of the embodiment of the light assembly 100 shown in FIG. 3. During assembly of the light assembly 100, the PCB 216 and the light source 202 mounted thereon are received within the cavity 208 of the housing 102. The PCB 216 may be inserted into the cavity 208 through the second opening 212 at the second end 206 of the housing 102. The PCB 216 (and/or other components of the light engine 214) may be mounted using latches, adhesive, interference fits, and/or by configuring the cavity 208 to have tight tolerances around the PCB 216 such that the PCB 216 is fixed in place. The one or more wires 108 are received in the cavity 208 through the second opening 212 and extend from the second opening 212. The wire(s) 108 may be fixed (e.g., soldered, glued, or mechanically fixed) to the PCB 216 within the cavity 208. The other end of the wire(s) 108 may be terminated to a device (not shown), which may provide power and/or control signals to the PCB 216. The light pipe assembly 104 is loaded up to the first end 204 of the housing 102 and the attachment end 220 may be received at least partially within the first opening 210.

In the illustrated embodiment, a collimator 402 (e.g., lens) is loaded through the first opening 210 prior to the light pipe assembly 104. The collimator 402 is located between the light source 202 and the attachment end 220 of the light pipe assembly 104. The collimator 402 may be formed of a clear light transmissive plastic material, such as polycarbonate and/or acrylic. The collimator 402 is configured to direct and/or focus light rays from the light source 202 towards the attachment end 220 to increase the amount of light that is received within the light pipe 222.

In an exemplary embodiment, the conforming seal 106 and the wire conforming seal 310 may be placed into position prior to conforming the seals 106, 310 to the respective components. For example, the conforming seal 106 and the wire conforming seal 310 may be tubes with internal diameters that are greater than the external perimeters of the ends 204, 206 of the housing 102, the light pipe assembly 104, and the one or more wires 108. During assembly, the seals 106, 310 may be placed on the ends 204, 206, respectively, prior to loading the light pipe assembly 104 and the wires 108. Alternatively, the conforming seal 106 may be slid from the distal end 308 (shown in FIG. 3) of the light pipe assembly 104 into position after loading the light pipe assembly 104 to the housing 102, and the wire conforming seal 310 may likewise be slid into position from the distal end of the wires 108. When the wire conforming seal 310 is in position, a first segment 404 of the wire conforming seal 310 extends along the housing 102 and a second segment 406 extends along the one or more wires 108 external of the housing 102.

Once the conforming seal 106 is in place and the housing 102 is in a desired rotational alignment with the light pipe assembly 104 (which is based on application preferences), a conforming process may seal the conforming seal 106 to the light pipe assembly 104 and the housing 102. The conforming process may also be applied to the wire conforming seal 310 to seal the wire conforming seal 310 to the second end 206 of the housing 102 and the one or more wires 108. The conforming process may include applying at least one of heat and/or pressure to the seal 106, which causes the conforming seal 106 to shrink and conform to the light pipe assembly 104 and housing 102 within the seal 106. For example, the heat may be applied in an oven, with a hot air gun, or another source of hot gas. The heating and/or pressure causes the conforming seal 106 to contract to a fraction of its original diameter. For example, the contraction ratio may be 3:1 or 4:1, such that a 15 mm tube may contract to 5 mm or less after the heat application or pressure application. The conforming seal 106 may be configured such that the conforming process causes the seal 106 to shrink primarily in only the radial plane (e.g., such that the diameter is reduced), and not in an axial plane (e.g., such that the length is reduced).

As the seals 106, 310 contract, the material of the seals 106, 310 conforms to the perimeters within the seals 106, 310. For example, the conforming seals 106, 310 may include adhesive inner linings that melt in the presence of heat and conform to the shapes (e.g., projections, ridges, depressions, etc.) of the perimeters of the components within the seals 106, 310 to form a moisture-proof barrier. The periphery of the light pipe assembly 104 at the first end 204 within the first segment 230 of the seal 106 may have a different shape and/or different size than a periphery of the housing 102 within the second segment 232 of the seal 106. But, the conforming seal 106 conforms to both the periphery of the housing 102 and the periphery of the light pipe assembly 104. More specifically, the first segment 230 of the conforming seal 106 conforms to the light pipe assembly 104 and the second segment 232 conforms to the housing 102. The wire conforming seal 310 may similarly contract such that the first segment 404 of the wire conforming seal 310 conforms to the housing 102 (e.g., at the second end 206) and the second segment 406 conforms to the wire(s) 108, even though the periphery of the housing 102 may have a larger diameter than the periphery of the one or more wires 108, as shown in FIG. 4.

As the seals 106, 310 conform to the corresponding components (e.g., light pipe assembly 104, housing 102, and/or wires 108), the seals 106, 310 tightly grip the components. The shrinking of the tubular conforming seals 106, 310 may produce significant friction between the seals 106, 310 and the corresponding components which results in a strong interference fit. For example, the conforming seal 106 secures the light pipe assembly 104 to the housing 102 such that the light pipe assembly 104 is not easily translated relative to (e.g., pulled apart from) the first end 204 of the housing 102. For example, if a force is applied to the light pipe assembly 104 that attempts to pull the light pipe assembly 104 apart from the housing 102, the force will be absorbed by the conforming seal 106. The conforming seal 106 may slightly stretch in the axial direction, which builds up tension and forces the light pipe assembly 104 back to the housing 102.

In addition, the attachment end 220 of the light pipe assembly 104 does not freely rotate relative to the first end 204 of the housing 102. Since the conforming seal 106 conforms to and grips the periphery of both the light pipe assembly 104 and the housing 102 after the conforming process, rotating the housing 102 relative to the light pipe assembly 104, or vice-versa, forces the first segment 230 of the conforming seal 106 to twist relative to the second segment 232. The conforming seal 106, however, opposes such twisting and generally holds the housing 102 in one position or orientation relative to the light pipe assembly 104. The wire conforming seal 310, after conforming to the second end 206 of the housing 102 and the one or more wires 108, also prohibits the wires 108 from free rotation and free translation relative to the housing 102, and vice-versa, for the same reasons as the conforming seal 106.

Figure 5:
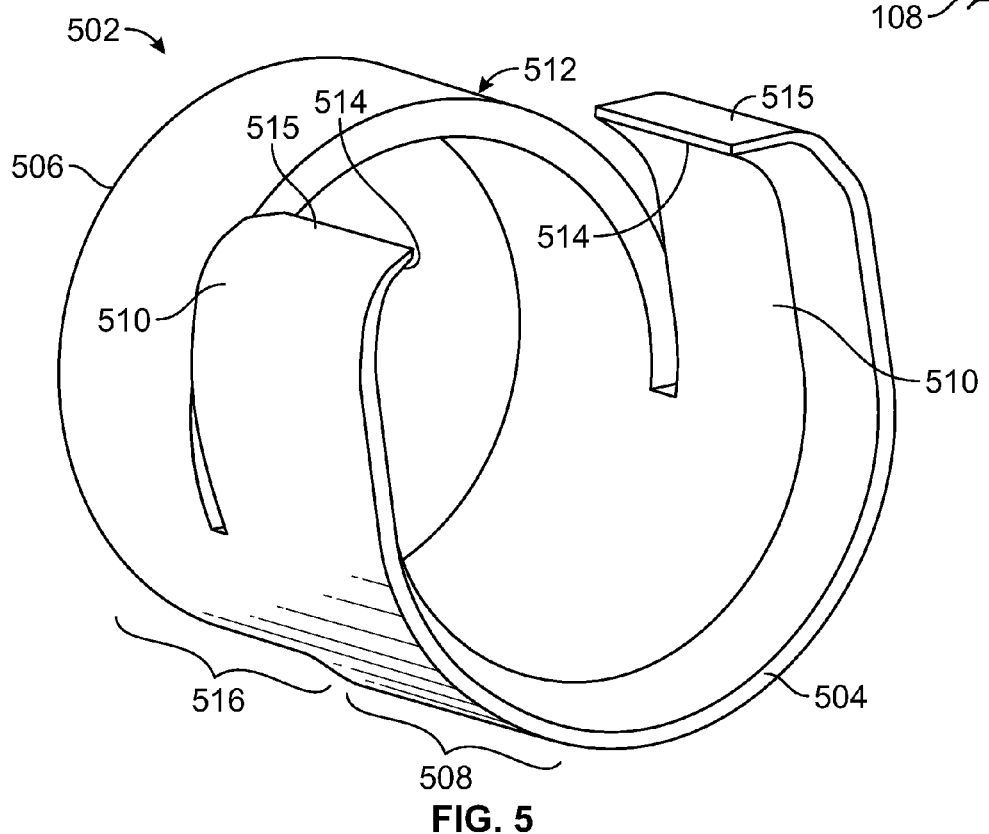
FIG. 5 is a perspective view of an alignment sleeve of a light assembly according to an exemplary embodiment.
Figure 6:
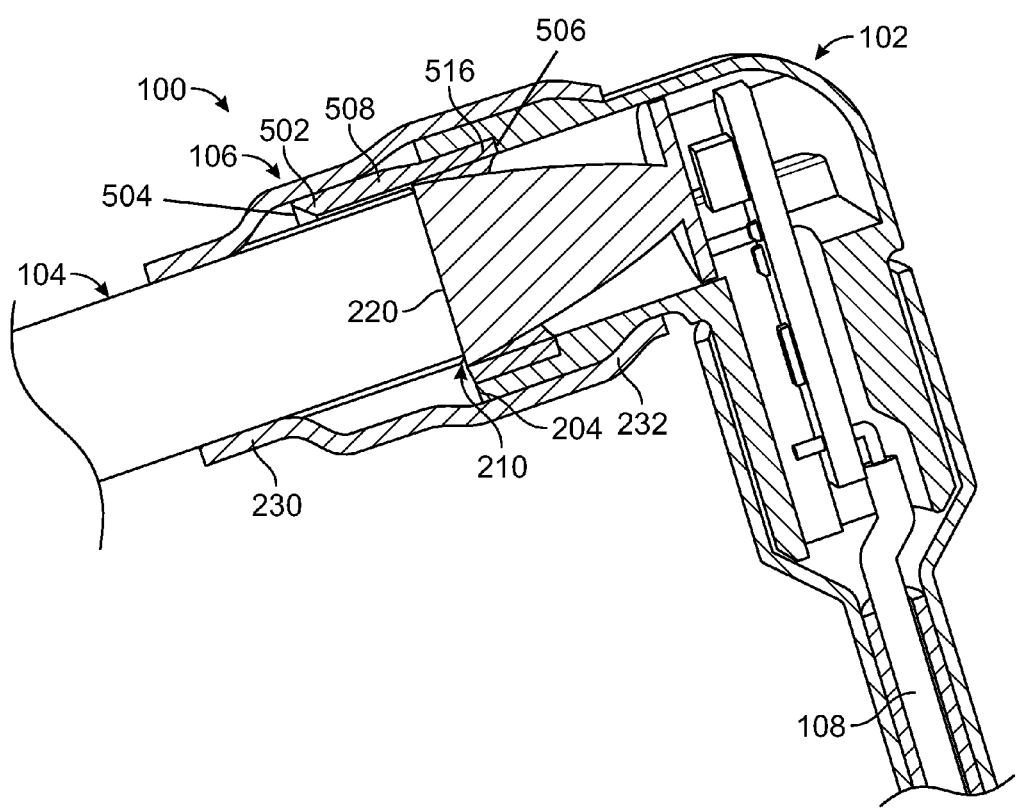
FIG. 6 shows a cross-section of an embodiment of a light assembly that includes the alignment sleeve shown in FIG. 5.

FIGS. 5 and 6 are directed to an embodiment of the light assembly 100 (shown in FIG. 1) that includes an alignment sleeve 502. FIG. 5 is a perspective view of the alignment sleeve 502 in isolation. FIG. 6 shows a cross-section of the embodiment of the light assembly 100 having the alignment sleeve 502. The alignment sleeve 502 is an optional component used to position and/or orient the light pipe assembly 104 relative to first end 204 of the housing 102. The alignment sleeve 502 has a receiving end 504 that receives the attachment end 220 of the light pipe assembly 104 therein and a mounting end 506 that interfaces with and/or mounts to the first end 204 of the housing 102. The alignment sleeve 502 may be formed of an insulating material, such as one or more plastics or other polymers, or may be formed of a non-insulating material, such as a metal like aluminum.

The receiving end 504 of the alignment sleeve 502 is configured to hold the light pipe assembly 104 in a fixed position relative to the alignment sleeve 502. For example, the alignment sleeve 502 includes an open tubular segment 508 at the receiving end 504. The open tubular segment 508 may have plural deflectable arms 510 and a gap 512 therebetween. The open tubular segment 508 is designed to accept light pipe assemblies 104 with attachment ends 220 of varying sizes and shapes. For example, as the attachment end 220 of the light pipe assembly 104 is received within the open tubular segment 508, the arms 510 may deflect radially outward. In addition, a portion of the light pipe assembly 104 may extend at least partially through the gap 512 between the arms 510. For example, the light pipe assembly 104 may have an elliptical (e.g., oval) shape such that a portion that includes one of the two vertices along the major axis (e.g., the longer cross-sectional axis) extends at least partially through the gap 512 between the arms 510. In addition, a portion of the light pipe assembly 104 may extend through the gap 512 even if the light pipe assembly 104 has a circular cross-section as long as the diameter is larger than the undeflected diameter of the receiving end 504 of the alignment sleeve 502.

As shown in FIG. 5, the deflectable arms 510 may each include at least one tooth 514. The teeth 514 may extend radially inward in order to mechanically engage the attachment end 220 of the light pipe assembly 104 to grip and orient the light pipe assembly 104. The teeth 514 may be disposed at distal ends 515 of the respective arms 510, proximate to the defined gap 512. As shown in FIG. 5, the teeth 514 may extend axially along the alignment sleeve 502. In other embodiments, each deflectable arm may have multiple teeth along the length of the arm and/or the teeth may be oriented in one or more directions transverse to the axial direction of the alignment sleeve. The teeth 514 grip the attachment end 220 in order to fix the light pipe assembly 104 to the alignment sleeve 502, such that the light pipe assembly 104 does not freely rotate and/or translate relative to the alignment sleeve 502.

The alignment sleeve 502 also includes a closed tubular segment 516 at the mounting end 506. The closed tubular segment 516 may be received within the first opening 210 of the housing 102 at the first end 204. Alternatively, the periphery of the first end 204 of the housing 102 may be received within the closed tubular segment 516. In an exemplary embodiment, the closed tubular segment 516 has a cylindrical shape and the first opening 210 of the housing 102 also is cylindrical with an accommodating size and shape such that when the closed tubular segment 516 is received within the first opening 210, the alignment sleeve 502 is rotatable relative to the housing 102. For example, if both shapes are circular, the alignment sleeve 502 may be rotatable 360 degrees relative to the housing 102. Because the light pipe assembly 104 within the open tubular segment 508 may be fixed to the alignment sleeve 502, both the light pipe assembly 104 and the alignment sleeve 502 may be rotated relative to the housing 102 until the conforming seal 106 undergoes the conforming process. Due to spacing and lighting restraints in an application, the housing 102 may need to be rotated with a specific angle relative to the light pipe assembly 104. For example, the housing 102 may be rotated such that the one or more wires 108 extend from the housing 102 in a specified direction to hide the wires 108 from view.

The alignment sleeve 502 allows the light pipe assembly 104 to mount to the housing 102 and rotate relative to the housing 102 until the conforming seal 106 is made to conform to the housing 102 and the light pipe assembly 104. As shown in FIG. 6, when the first segment 230 conforms to the light pipe assembly 104 and the second segment 232 conforms to the housing 102, the conforming seal 106 surrounds and encloses the alignment sleeve 502. As discussed above, once the conforming seal 106 undergoes the conforming process, the seal 106 secures the light pipe assembly 104 to the housing 102 and prohibits free rotation of the light pipe assembly 104 relative to the housing 102. Since the conforming process may be performed using a portable hot air gun, in an embodiment, the conforming process may be performed once the light assembly 100 is positioned in an application (e.g., in a running board and the like) and the housing 102 is rotated relative to the light pipe assembly 104 to a preferred orientation.

Figure 7:
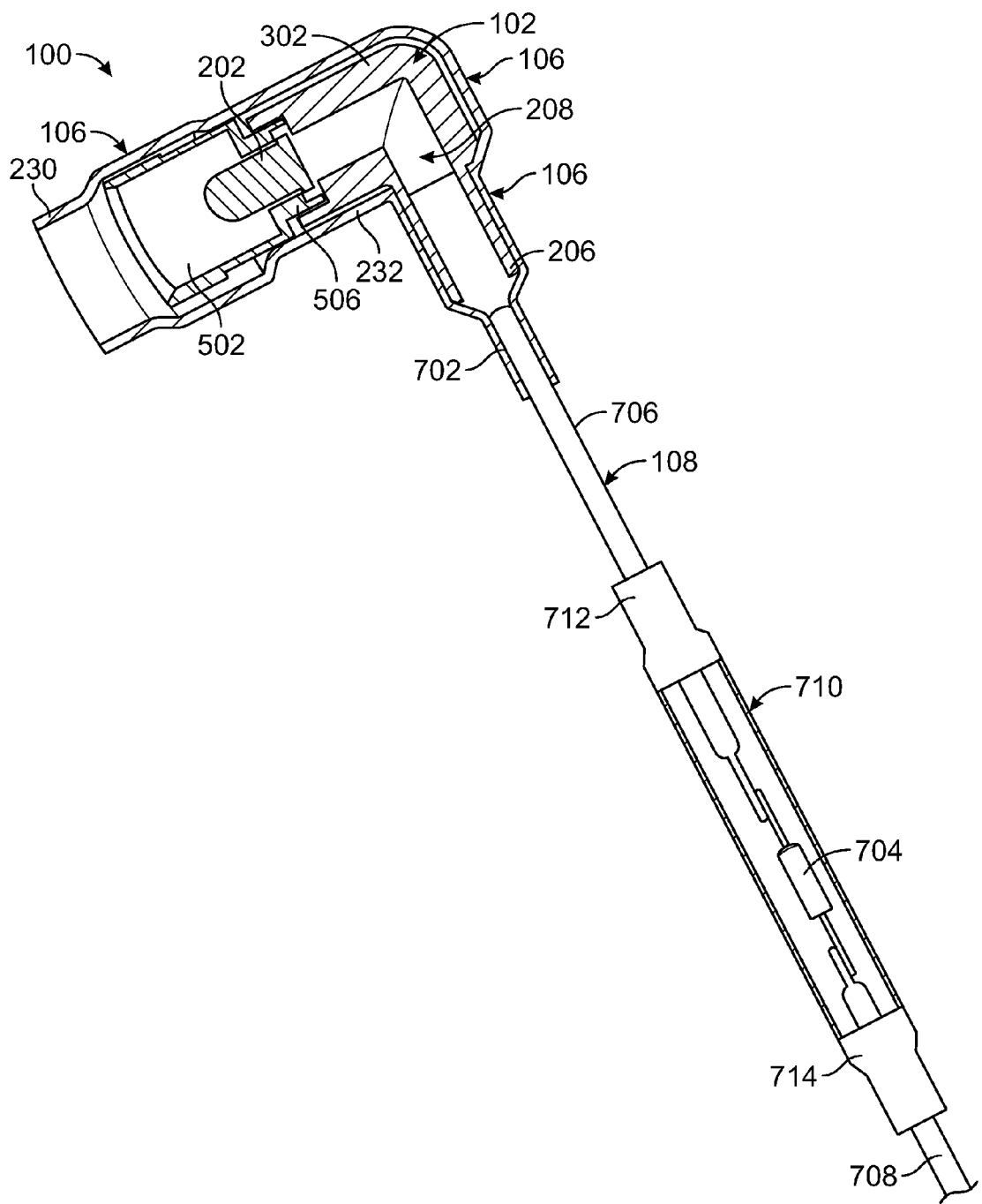
FIG. 7 shows a cross-section of a light assembly formed in accordance with an exemplary embodiment.

FIG. 7 shows a cross-section of a light assembly 100 formed in accordance with an exemplary embodiment. The embodiment of the light assembly 100 shown in FIG. 7 may be similar to the previously-described embodiments except for a few noted differences. For example, the light source 202 in the light assembly 100 of FIG. 7 is through-hole mounted within the cavity 208 of the housing 102 instead of being mounted to a PCB 216 (shown in FIG. 2). The light source 202 may also extend at least partially through the mounting end 506 of the alignment sleeve 502 to be more proximate to the attachment end 220 of the light pipe assembly 104. In addition, the conforming seal 106 shown in FIG. 7 may extend over the entire body 302 of the housing 102. In addition to the first segment 230 that conforms to the light pipe assembly 104 and the second segment 232 that conforms to the housing 102, the conforming seal 106 may have a third segment 702 that extends beyond the second end 206 of the housing 102 and conforms to the one or more wires 108. The third segment 702 extends along and at least partially surrounds the wires 108 external to the housing 102. As such, in the embodiment shown in FIG. 7, the single conforming seal 106 may be used instead of having two separate conforming seals (e.g., seals 106 and 310 shown in FIG. 3). In other embodiments, more than two conforming seals may be used to secure the light pipe assembly 104 and the wires 108 to the ends 204, 206, respectively of the housing 102.

In the illustrated embodiment, the one or more wires 108 may be mechanically coupled to an electrical component 704 that is external to the housing 102. For example, one wire 108 may have a first wire segment 706 that is received in and extends from the housing 102 through the second opening 212. The first wire segment 706 is electrically and mechanically coupled to the electrical component 704. The wire 108 also includes a second wire segment 708 that is electrically and mechanically coupled to the electrical component 704. The electrical component 704 may be a resistor, a transistor, an integrated circuit, a circuit breaker, a power source, a controller, and/or the like. A wire conforming seal 710 may be slid into a position that surrounds and encloses the electrical component 704 as well as extends along at least part of the first and second wire segments 706, 708 of the wire 108. The wire conforming seal 710 may undergo a conforming process which conforms the wire conforming seal 710 to the first and second wire segments 706, 708. For example, a first wire seal segment 712 may conform to the first wire segment 706 and a second wire seal segment 714 may conform to the second wire segment 708. The wire conforming seal 710 thus prohibits debris and other contaminants from accessing the electrical component 704 and damaging the electrical connection or circuitry of the electrical component 704, even in external applications. In addition, the wire conforming seal 710 may absorb forces that pull the first wire segment 706 and the second wire segment 708 apart, which reduces the forces encountered by the wire segments 706, 708 and the electrical component 704.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112(f) or (pre-AIA) 35 U.S.C. §112, sixth paragraph, unless and until such claim limitations expressly use the phrase "means for" followed by a statement of function void of further structure.

What is claimed is:

1. A light assembly comprising:
a housing having a first end and a second end, the housing defining a cavity extending through the housing between the first and second ends, the housing having first and second openings to the cavity at the first and second ends, respectively, the housing holding a light source within the cavity, the light source configured to emit light;
a light pipe assembly elongated between an attachment end and an opposing distal end, the attachment end of the light pipe assembly disposed at the first end of the housing, the attachment end of the light pipe assembly optically coupled to the light source such that the light emitted by the light source is received by the light pipe assembly at the attachment end and is transmitted through the light pipe assembly towards the distal end; and
a conforming seal having a tubular shape that at least partially surrounds the housing and the light pipe assembly, wherein a first segment of the conforming seal peripherally surrounds and conforms around a portion of the light pipe assembly at least proximate to the attachment end of the light pipe assembly and a second segment of the conforming seal peripherally surrounds and conforms around a portion of the housing at least proximate to the first end of the housing, wherein the first segment of the conforming seal conforms around the light pipe assembly and the second segment of the conforming seal conforms around the housing by contracting radially into engagement with the respective portions of the light pipe assembly and the housing that are disposed within the tubular conforming seal in response to at least one of a heat application or a pressure application, the conforming seal contracting radially to a fraction of an original diameter of the conforming seal,
wherein the portion of the housing at least proximate to the first end includes a wide diameter area and a narrow diameter area that has a reduced diameter relative to the wide diameter area, the wide diameter area spaced apart axially from the narrow diameter area and located more proximate to the first end of the housing than the narrow diameter area, wherein the second segment of the conforming seal conforms around both the narrow diameter area and the wide diameter area.

2. The light assembly of claim 1, wherein the conforming seal secures the light pipe assembly to the housing such that the attachment end of the light pipe assembly does not freely rotate or freely translate relative to the first end of the housing.

3. The light assembly of claim 1, wherein the light pipe assembly comprises one or more of a light pipe, a shroud, a light guide, a lens, or a reflector.

4. The light assembly of claim 1, further comprising a wire that provides at least one of power or control signals to the light source, the wire received in and extending from the housing through the second opening, wherein the conforming seal has a third segment that extends along and peripherally surrounds a portion of the wire external of the housing, the third segment conforming to the wire.

5. The light assembly of claim 1, further comprising:
a wire that provides at least one of power or control signals to the light source, the wire received in and extending from the housing through the second opening, and
a wire conforming seal separate from the conforming seal, the wire conforming seal having a first segment that extends along and surrounds an axial length of the housing and a second segment that extends along and surrounds an axial length of the wire outside of the housing, the first segment conforming to the housing and the second segment conforming to the wire by contracting radially into engagement with the respective lengths of the housing and the wire responsive to at least one of a heat application or a pressure application.

6. The light assembly of claim 1, further comprising an alignment sleeve having a receiving end that receives the attachment end of the light pipe assembly therein and a mounting end that is received within the first opening of the housing at the first end, the receiving end holding the light pipe assembly in a fixed position relative to the alignment sleeve, the mounting end rotatable relative to the housing to orient the light pipe assembly at a desired position relative to the housing prior to the conforming seal conforming to the light pipe assembly and the housing.

7. The light assembly of claim 1, wherein the housing has a right-angle body having a first housing segment that includes the first end and a second housing segment that includes the second end, the first housing segment oriented orthogonally to the second housing segment.

8. A light assembly comprising:
a housing having a first end and a second end, the housing defining a cavity extending through the housing between the first and second ends, the housing having first and second openings to the cavity at the first and second ends, respectively, the housing holding a light source within the cavity, the light source configured to emit light;
a light pipe assembly elongated between an attachment end and an opposing distal end, the attachment end of the light pipe assembly disposed at the first end of the housing and optically coupled to the light source such that the light emitted by the light source is received by the light pipe assembly at the attachment end and is transmitted through the light pipe assembly towards the distal end;

an alignment sleeve having a receiving end that receives the attachment end of the light pipe assembly and a mounting end that is received within the first opening of the housing at the first end, the receiving end holding the light pipe assembly in a fixed position relative to the alignment sleeve, the mounting end rotatable relative to the housing to orient the light pipe assembly at a desired position relative to the housing; and a conforming seal having a tubular shape that surrounds and encloses the alignment sleeve and at least partially surrounds the housing and the light pipe assembly, wherein a first segment of the conforming seal peripherally surrounds and conforms around a portion of the light pipe assembly that is outside of the receiving end of the alignment sleeve and a second segment of the conforming seal peripherally surrounds and conforms around a portion of the housing at least proximate to the first end of the housing, wherein the first segment of the conforming seal conforms around the light pipe assembly and the second segment of the conforming seal conforms around the housing by contracting radially into engagement with the respective portions of the light pipe assembly and the housing that are disposed within the tubular conforming seal in response to at least one of a heat application or a pressure application, the conforming seal contracting radially to a fraction of an original diameter of the conforming seal, wherein the portion of the housing at least proximate to the first end includes a wide diameter area and a narrow diameter area that has a reduced diameter relative to the wide diameter area, the wide diameter area spaced apart axially from the narrow diameter area and located more proximate to the first end of the housing than the narrow diameter area, wherein the second segment of the conforming seal conforms around both the narrow diameter area and the wide diameter area.

9. The light assembly of claim 8, wherein the conforming seal secures the light pipe assembly to the housing such that the light pipe assembly and the alignment sleeve do not freely rotate or freely translate relative to the housing.

10. The light assembly of claim 8, wherein the alignment sleeve includes a closed tubular segment at the mounting end and an open tubular segment at the receiving end, the open tubular segment having plural deflectable arms and a gap therebetween, the deflectable arms configured to engage a perimeter surface of the light pipe assembly.

11. The light assembly of claim 10, wherein the closed tubular segment has a cylindrical shape and the first opening of the housing is cylindrical such that the alignment sleeve is rotatable 360 degrees relative to the housing.

12. The light assembly of claim 10, wherein the deflectable arms deflect radially outward upon the attachment end of the light pipe assembly being received within the open tubular segment and a portion of the light pipe assembly extends at least partially into the gap between the arms.

13. The light assembly of claim 10, wherein the deflectable arms include at least one tooth at a distal end thereof, the tooth extending radially inward to mechanically engage the attachment end of the light pipe assembly.

14. The light assembly of claim 8, further comprising a wire that provides at least one of power or control signals to the light source, the wire received in and extending from the housing through the second opening, wherein the conforming seal has a third segment that extends along and peripherally surrounds a portion of the wire external of the housing, the third segment conforming to the wire.

15. The light assembly of claim 8, further comprising:
a wire that provides at least one of power or control signals to the light source, the wire received in and extending from the housing through the second opening; and
a wire conforming seal separate from the conforming seal, the wire conforming seal having a first segment that extends along and surrounds an axial length of the housing and a second segment that extends along and surrounds an axial length of the wire outside of the housing, the first segment conforming to the housing and the second segment conforming to the wire by contracting radially into engagement with the respective lengths of the housing and the wire responsive to at least one of a heat application or a pressure application.

16. A light assembly comprising:
a housing having a first end and a second end, the housing defining a cavity extending through the housing between the first and second ends, the housing having first and second openings to the cavity at the first and second ends, respectively, the housing holding a light source within the cavity, the light source configured to emit light;
a light pipe assembly including a light pipe and a shroud at least partially covering a surface of the light pipe, the light pipe assembly elongated between an attachment end and an opposing distal end, the attachment end of the light pipe assembly disposed at the first end of the housing, the attachment end of the light pipe assembly optically coupled to the light source such that the light emitted by the light source is received by the light pipe at the attachment end and is transmitted through the light pipe towards the distal end; and
a conforming seal having a tubular shape including a first segment and a second segment axially spaced from the first segment, the first segment surrounding a portion of the light pipe assembly at least proximate to the attachment end, the second segment surrounding a portion of the housing at least proximate to the first end, the conforming seal configured to transition from a pre-conformed state to a conformed state in response to at least one of a heat application or a pressure application by contracting radially to engage and conform around the respective portions of the light pipe assembly and the housing within the conforming seal, the conforming seal in the conformed state having a reduced diameter relative to an original diameter of the conforming seal in the pre-conformed state,
wherein the portion of the housing at least proximate to the first end includes a wide diameter area and a narrow diameter area that has a reduced diameter relative to the wide diameter area, the wide diameter area spaced apart axially from the narrow diameter area and located more proximate to the first end of the housing than the narrow diameter area, wherein the second segment of the conforming seal conforms around both the narrow diameter area and the wide diameter area.

17. The light assembly of claim 16, wherein the shroud encloses the light pipe, the first segment of the conforming seal directly engaging the shroud and not directly engaging the light pipe.

18. The light assembly of claim 16, further comprising a wire that provides at least one of power or control signals to the light source, the wire received in and extending from the housing through the second opening, wherein the conforming seal has a third segment that surrounds a portion of the wire external of the housing, the third segment forming around the wire in the conformed state of the conforming seal.

19. The light assembly of claim 16, further comprising:
- a wire that provides at least one of power or control signals to the light source, the wire received in and extending from the housing through the second opening; and
- a wire conforming seal separate from the conforming seal, the wire conforming seal having a first segment that extends along and surrounds an axial length of the housing and a second segment that extends along and surrounds an axial length of the wire outside of the housing, the first segment conforming to the housing and the second segment conforming to the wire by contracting radially into engagement with the respective lengths of the housing and the wire responsive to at least one of a heat application or a pressure application.

* * * * *